(12) United States Patent
Faber et al.

(10) Patent No.: US 9,966,740 B2
(45) Date of Patent: May 8, 2018

(54) INTERNAL ARC MANAGEMENT AND VENTILATION FOR ELECTRICAL EQUIPMENT

(71) Applicant: SCHNEIDER ELECTRIC USA, INC., Schaumburg, IL (US)

(72) Inventors: Timothy R. Faber, Marion, IA (US); Cameron Woodson, Cedar Rapids, IA (US); Justin Siefkes, Swisher, IA (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 47 days.

(21) Appl. No.: 14/904,714

(22) PCT Filed: Jul. 17, 2013

(86) PCT No.: PCT/US2013/050797
§ 371 (c)(1),
(2) Date: Jan. 13, 2016

(87) PCT Pub. No.: WO2015/009291
PCT Pub. Date: Jan. 22, 2015

(65) Prior Publication Data
US 2016/0156163 A1 Jun. 2, 2016

(51) Int. Cl.
*H02B 11/02* (2006.01)
*H02B 13/025* (2006.01)
(Continued)

(52) U.S. Cl.
CPC .............. *H02B 11/02* (2013.01); *H02B 3/00* (2013.01); *H02B 13/025* (2013.01); *H01H 9/342* (2013.01); *H02B 1/565* (2013.01)

(58) Field of Classification Search
CPC ........ H02B 13/025; H02B 1/056; H02B 1/28; H02B 1/565; H02B 11/26; H02B 1/21;
(Continued)

(56) References Cited

U.S. PATENT DOCUMENTS 2,824,939 A * 2/1958 Claybourn ............... H02B 1/56
174/16.1
4,620,126 A 10/1986 Manske
(Continued)

FOREIGN PATENT DOCUMENTS

DE 102011000837 8/2012
EP 1498921 1/2005
(Continued)

OTHER PUBLICATIONS

English Language Machine Translation of German Patent Application Publication No. DE102011000837, published on Aug. 23, 2012, 20 pages.
(Continued)

*Primary Examiner* — Adam B Dravininkas
(74) *Attorney, Agent, or Firm* — Locke Lord LLP

(57) ABSTRACT

An electrical enclosure is configured for passive self-extinguishing arc protection and cooler operation of enclosed equipment. The enclosure has a channeled ventilation system with arc channels in fluid communication with exhaust channels. The arc channels around each phase of the enclosed conductors are of sufficient length to help attenuate an arc. The exhaust channels are placed in communication with the arc channels. The geometry and materials of the arc channels and exhaust channels cause the energy balance of the enclosure to favor passive arc interruption. Ventilation channels may be in fluid communication with the arc channels and the exhaust channels to provide cooling airflows over enclosed power conductors during normal non-arcing operation.

20 Claims, 8 Drawing Sheets

(51) Int. Cl.
*H02B 3/00* (2006.01)
*H01H 9/34* (2006.01)
*H02B 1/56* (2006.01)

(58) Field of Classification Search
CPC .......... H02B 1/56; H02B 11/133; H02B 1/20; H02B 1/38; H01H 9/342; H01H 73/18; H01H 9/047; H01H 9/042; H02H 3/16
See application file for complete search history.

(56) References Cited

U.S. PATENT DOCUMENTS

| | | | | |
|---|---|---|---|---|
| 5,193,049 | A * | 3/1993 | Jackson | H02B 13/025 361/676 |
| 5,574,624 | A * | 11/1996 | Rennie | H02B 13/025 200/289 |
| 6,248,971 | B1 * | 6/2001 | Morel | H01H 9/40 218/152 |
| 6,417,443 | B1 * | 7/2002 | Smith | H02B 1/565 174/17 VA |
| 7,098,763 | B2 | 8/2006 | Larcher | |
| 7,821,774 | B2 * | 10/2010 | Josten | H02B 13/025 174/17 VA |
| 8,101,881 | B2 * | 1/2012 | Miller | H02B 13/025 218/157 |
| 2003/0117045 | A1 | 6/2003 | Byron et al. | |
| 2005/0207085 | A1 * | 9/2005 | Jur | H01H 9/342 361/129 |
| 2009/0185333 | A1 * | 7/2009 | Coomer | H02B 13/025 361/622 |
| 2009/0212022 | A1 * | 8/2009 | Josten | H02B 13/025 218/157 |
| 2010/0258532 | A1 * | 10/2010 | Miller | H02B 13/025 218/157 |
| 2012/0028559 | A1 * | 2/2012 | Kingston | H05K 5/0213 454/184 |
| 2012/0097642 | A1 | 4/2012 | Shea et al. | |
| 2012/0218067 | A1 | 8/2012 | Ballard et al. | |
| 2013/0019464 | A1 | 1/2013 | Ballard et al. | |
| 2013/0143478 | A1 | 6/2013 | Arcos et al. | |

FOREIGN PATENT DOCUMENTS

| | | |
|---|---|---|
| EP | 2256884 | 1/2010 |
| JP | S55109104 | 8/1980 |
| JP | 2009118617 | 5/2009 |
| WO | WO2007085209 | 8/2007 |
| WO | WO2013099393 | 7/2013 |

OTHER PUBLICATIONS

Extended European Search Report for EP Patent Application No. 13889543.8 dated Apr. 6, 2017, 11 pages.
International Search Report and Written Opinion for PCT/US2013/050797, dated Jan. 10, 2014, 11 pages.
Search Report for Russian Patent Application No. 2015153062, dated Jun. 26, 2017, 2 pages.
English Language Machine Translation of Japanese Patent Application Publication No. 2009118617, published on May 28, 2009, 13 pages.
English Language Machine Translation of International Patent Application Publication No. WO2013099393, published on Jul. 4, 2013, 10 pages.
English Language Machine Translation of Description of Japanese Patent Application Publication No. JPS55109104, published on Aug. 22, 1980, 9 pages.

* cited by examiner

INTERNAL ARC MANAGEMENT AND VENTILATION FOR ELECTRICAL EQUIPMENT

FIELD OF THE INVENTION

The present invention relates generally to electrical distribution equipment and conductors contained within enclosures referred to herein generally as cabinets, although such enclosures need not have doors to benefit from the present invention. The invention relates more particularly to passively preventing, and controlling the effects of, unintended arc faults in electrical cabinets by use of a tunneled ventilation and arc extinguisher system for an electrical enclosure.

BACKGROUND OF THE INVENTION

The hazards of unexpected and/or uncontrolled arcing events, also called arc faults, in an electrical cabinet are well known and include potential damage to equipment and harm to personnel in the operating environment caused by arc flash and arc blast, hereinafter referred to for simplicity as arc blast. Both passive and active arc control means are known in the art. Passive means include directed venting of the arc blast energy and gasses out of the cabinet. Other passive means may include reinforcement of the cabinet structure in an effort to withstand the blast. Neither of the above passive methods limits fault duration or is easily retrofitable into existing switchgear cabinets. Active means usually include some form of sensing and a switching mechanism to control the current. Concerns with active means may include expense, nuisance trips, speed, and undetected system failures. Of course, the quicker the arc is controlled the less harm is likely to be done by the arcing event.

SUMMARY OF THE INVENTION

A quick, economical, passive mechanism for controlling and extinguishing arc events inside electrical cabinets would be welcome in the art. To that end, the present invention in its various aspects and embodiments teaches and provides an arc management system having dielectric surrounds for the conductors, generally referred to herein as "arc channels," surrounding the likely arc sites within a cabinet, such as electrical connection or proximity points between or among conductors and equipment, and preferably for the electrical conductors of each phase. The arc channels can then be joined to exhaust channels, e.g., plenums, which act as chambers and form a geometry to hold the arc until it is extinguished. The arc channel and exhaust channel will lengthen the nascent arc and attenuate the current and temperature until preferably the arc is extinguished.

In some embodiments, the arc channels and exhaust channels are tunnels preferably formed by case members having opposable barriers to form gas tight seals of individual parallelepiped or other polyhedral structures. In some embodiments, the arc channels and exhaust channels are boxes preferably formed by case members having overlapping barriers to form individual parallelepiped or other polyhedral structures with non-gas tight seals. Since the arc and exhaust channel structures can be considered as basically tubular, terminology common to curved surfaces may be used herein as an aid to explanation.

Further, because the exhaust channels can be integrated into ventilation systems for the equipment, the operation of the enclosure can be cooler, resulting in better performance with less material expenditure. By combining arc management structure and ventilation structure, the benefits of both may be combined and utilized within the typically confined spaces of electrical enclosures. Thus several advantages may be provided by the arc management system including arc prevention by physical barrier to inadvertent entry of shorting conductors such as dropped tools or vermin; and arc channeling with extinguishing or attenuation by the arc channels and exhaust channels which are sized, located and arranged so as to draw out and hold the arc thereby lessening its current and heat with attendant equipment and safety benefits.

In its various aspects the invention may provide a readily adaptable arc management and ventilation system with a passive arc attenuation for fixed breakers or draw out breakers in various mounting configurations and enclosures. By "breakers" the person having ordinary skill in the art will understand that various pieces of equipment such as safety switches, motor control units and the like; and well as electrical connection or proximity points of the conductors, can be safely accommodated and managed according to the present invention.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The invention may best be understood by reference to the following description taken in conjunction with the accompanying drawings.

DETAILED DESCRIPTION OF THE ILLUSTRATED EMBODIMENTS

Figure 1:
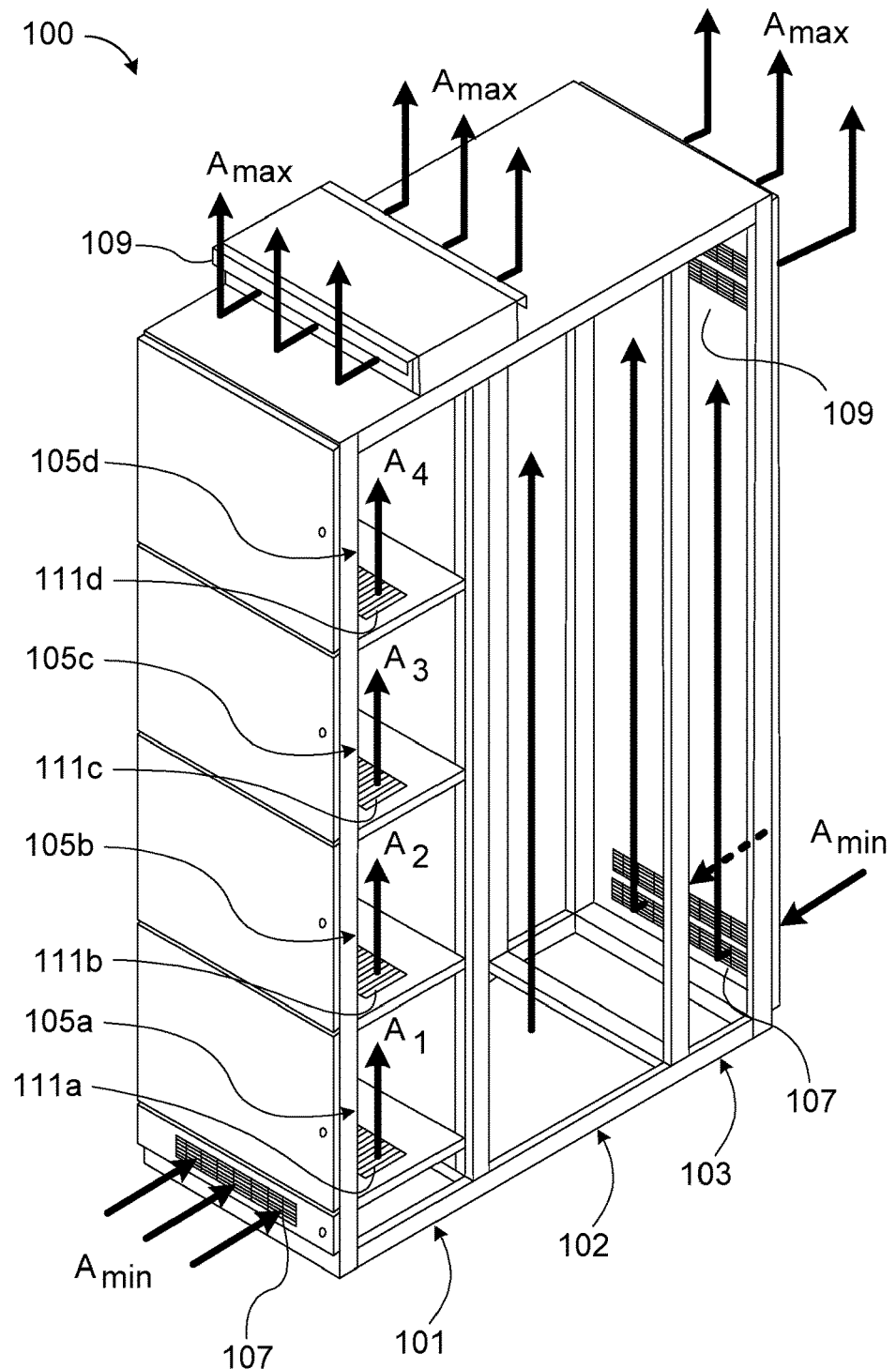
FIG. 1 is a perspective view of a switchgear cabinet with a circuit breaker section and a bus section, in accordance with an exemplary embodiment of one suitable environment for the invention.

Referring to FIG. 1, an electrical enclosure in the form of a switch gear cabinet 100 generally known in the art is shown having a breaker section 101 for containing circuit breakers or other electrical equipment, a bus section 102 for distributing power to the various electrical equipment, and a cable section 103 for accepting and distributing line power. The switch gear cabinet 100 or a section thereof may serve as a cabinet protecting various parts of the electrical equipment or conductors from the outside environment as known in the art. As used herein, a "cabinet" may also be a protective enclosure within another larger cabinet in some instances. Several breaker compartments 105a-105d are stacked vertically in the breaker section 101 so that each draw out breaker (FIG. 2) will have a structure for receiving its draw out chassis for moving the breaker in and out of contact with the electrical supply feeding from the other two sections 102, 103.

The configuration of this type of cabinet 100 reduces airflow and transfers heat from breaker to breaker vertically. For example, cool airflow Amin enters through bottom inlet vents 107 of the cabinet 100 and heats up to Amax as the airflow travels vertically towards and through upper exhaust vents 109. As airflow travels through compartment vents 111a-111d of the respective breaker compartments 105a-105d, the airflow heat increases from A1 in a first breaker compartment 105a, to A2 in a second compartment 105d, and so on, until the airflow exits the cabinet 100 through the respective upper exhaust vent 109.

This type of cabinet 100 could also use better arc management. Arcs may be prone to happen due to reduced spacing and barrier-less energized conductors. Heretofore, the electrical conductors of adjacent phases have generally lacked barriers that can help attenuate and/or interrupt arcs during an arc fault event.

Figure 2:
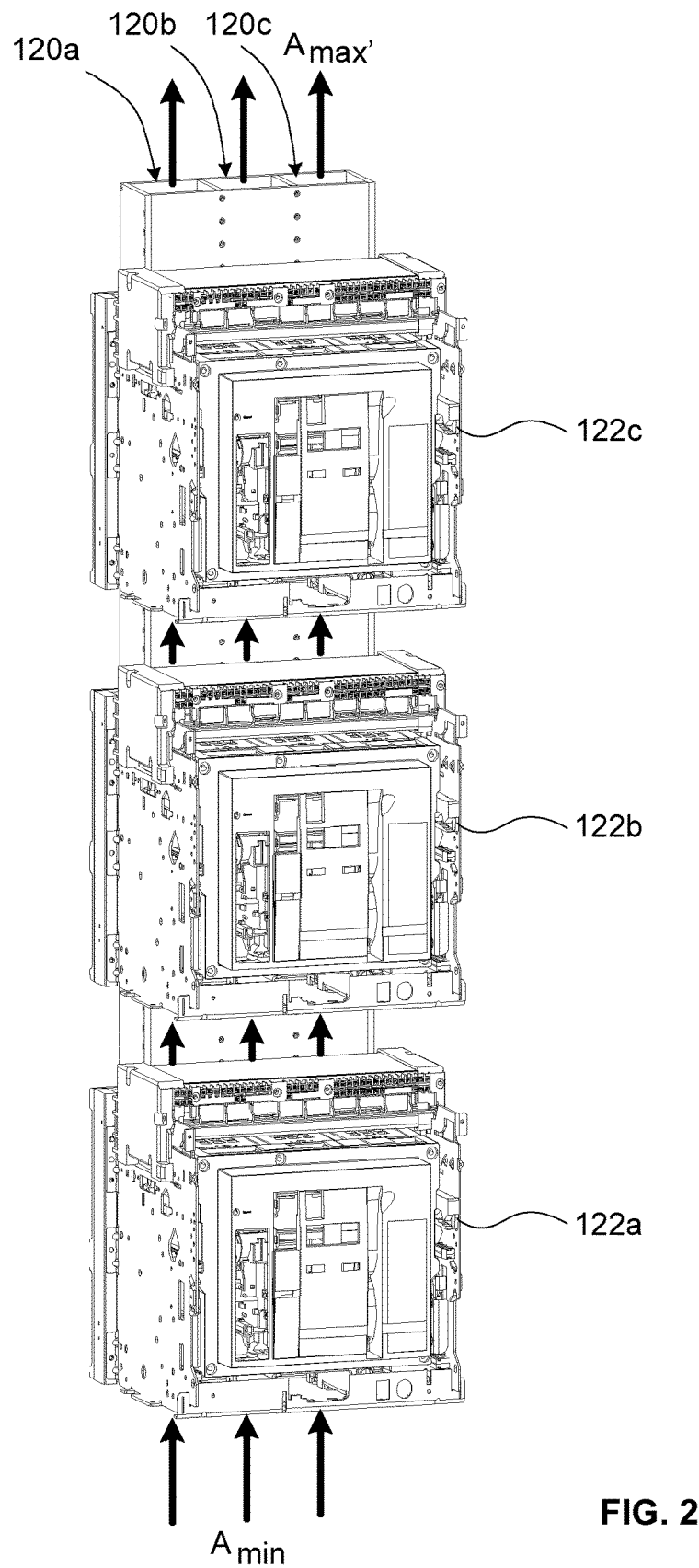
FIG. 2 is a front perspective view of draw out circuit breakers connected at the rear by a common chimney structure.

Referring also to FIG. 2, in our prior Schneider Electric application Ser. No. 13/452,145; filed Apr. 20, 2012; individual arc channels 120a-120c are added in the back plane behind draw out breakers 122a-122c with a common chimney vent for each of the three phases to increase airflow and reduce heat build-up in the cabinet 100. The draw out breakers 122a-122c are insertable in respective breaker compartments 105a-105c of the cabinet 100. However, in this arrangement the heat may still build up vertically to an undesirable level for upper breakers.

It has been found that the arc resistance is directly proportional to arc length and arc resistance is inversely proportional to arc (channel) cross section. Here in the present invention, we take advantage of lengthening the arc rather than shrinking the cross sectional area, thus allowing us to increase arc resistance to the point the arc self extinguishes. The exhaust plenums of the present invention further allow the arc products to cool to a lower temperature before exiting the cabinet.

Figure 3:
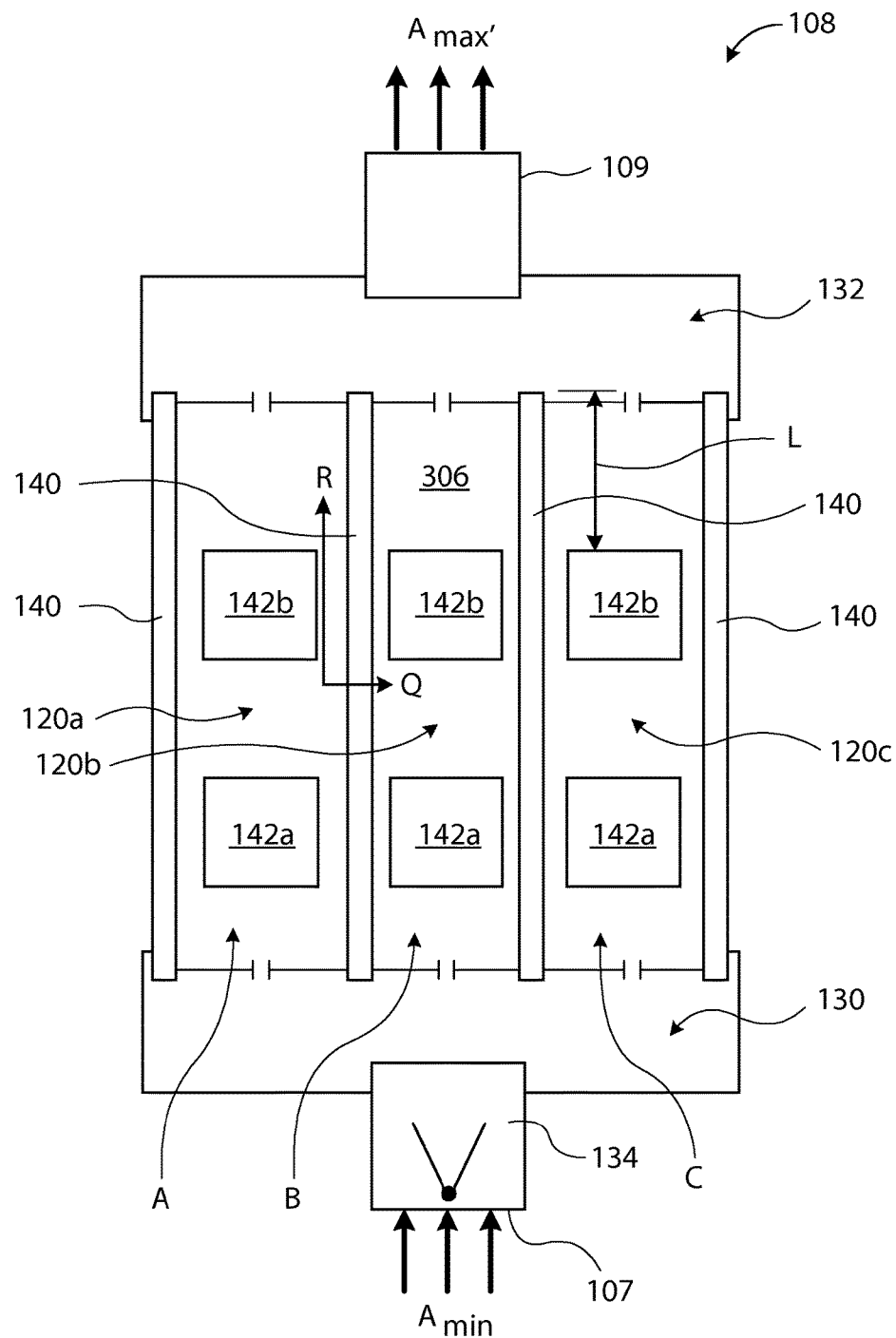
FIG. 3 is a schematic front view of the back mold of a breaker compartment with its conductor connections.
Figure 4:
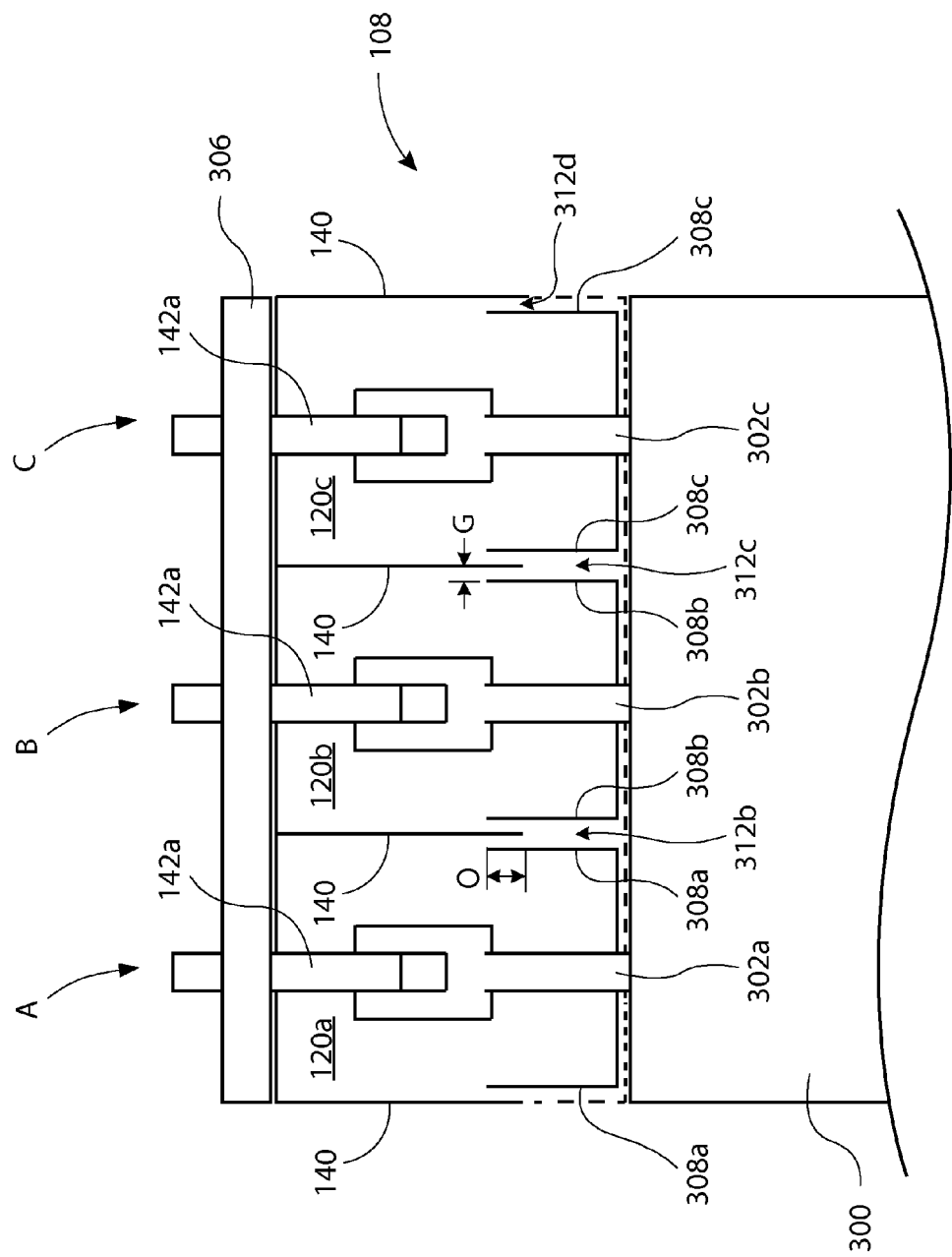
FIG. 4 is a schematic bottom view of a breaker in place with the back mold of FIG. 3.

Referring to FIGS. 3 and 4, an exemplary configuration illustrates the backplane or back mold 108 of one draw out breaker compartment, e.g., 105a, implemented with arc channels 120a-120c, each of the arc channels 120a-120c corresponding to a respective electrical phase A-C for a draw out breaker 300. The arc channels 120a-120c are in fluid communication with ventilation channels which include an inlet vent channel 130 and an exhaust channel 132.

The inlet vent channel 130 in this example is a single intake plenum that receives airflow Amin through the inlet vent 107, after the airflow travels through a backflow valve 134. The backflow valve 134 (and/or other optional filters) prevents arc products from exiting the cabinet 100 through the inlet vent 107. Similar to the inlet vent channel 130, the exhaust channel 132 in this example is an exhaust common plenum that receives airflow from all the arc channels 120a-120c. The airflow continues outside the cabinet 100 through the upper exhaust vent 109 and exits as Amax'. The exhaust channel 132 is positioned near the line side bus connections 142b for the circuit breaker (not shown in FIG. 3) and acts as a funnel for arc gas received from an exhaust end of the arc channels 120a-120c. As such, the exhaust channel 132 serves as a gas mixing plenum in which arc products produced in one or more of phases A-C can be accepted.

FIG. 4, a diagrammatic view of a draw out breaker 300 and the back mold 108 according to one aspect of the invention, shows the fixed barriers 140 of the back mold 108 in relation to cluster shields 308 a-308 c on the back of the breaker 300. The cluster shields, collectively 308, are parallelepiped structures which surround the line and load connectors, also sometimes called clusters, 302 a-302 c of the draw out circuit breaker 300 for each of the three phases A-C. When the breaker 300 is in an "engaged" position as seen in FIG. 4, the electrical connectors 302 a-302 c are engaged with respective bus connectors, collectively 142 a and 142 b for load and line connections respectively, attached to a back plane 306 of the back mold 108. The cluster shields 308 a-308 c fit closely within fixed barriers 140 of the back mold 108 and the resulting overlapping barriers for each phase form the arc channels 120 a-120 c which are vented through the "top" or exhaust channel 132 (FIG. 3) common to each phase A-C. As shown in FIG. 4, the fixed barriers 140 overlap the cluster shields 308 a-308 c by a length O and are separated from the cluster shields 308 a-308 c by a distance G such that the resulting arc channels 120 a-120 c have non-gas tight seals as shown by arrows 312 b-312 d.

If an arc does occur, the arc channels are designed to prevent the arc from being sustainable by drawing out the arc along a certain geometry including a cross sectional area and a sufficient length L from the energized contact to the exhaust channel. This geometry, aided by the sublimation of materials forming the arc channel and exhaust channels during the arc event, forms a negative energy balance forcing the arc to extinguish and not reignite. Certain thermoset polyesters, thermoplastics or vulcanized fiber materials may be used as required for the desired sublimation. Thus, it will be appreciated that with the fixed barriers 140 of the proper materials forming the arc channels and their attached exhaust channels, e.g., the plenum of exhaust vent channel 132, the present invention removes the need for clearing the arc by an active arc extinguishing device, as would be typical in the known art.

The fixed barriers 140 can be located between phases A-C, between any phase A-C and ground, between line and load terminals (for devices such as circuit breakers, contactors, or switches), between power connectors or insulated cables, or lugs (for devices such as bus bars). By reduction or elimination of through-air exposure between energized and grounded surfaces of different potential, the fixed barriers 140 are designed to reduce the chance that a phase to ground or phase to phase arc occurs in the first place. The arc channels 120 a-120 c formed by fixed barriers 140 and cluster shields 308 provide mechanical and dielectric separation between phases A-C and prevent sustained direct phase-to-phase arcing in the direction Q (FIG. 3) along a shortest path between phases A-C. Instead, the arc gases are routed in a direction R, which is perpendicular to the shortest path in the direction Q, and are kept separated until the length L has been achieved to promote self-extinguishing behavior. The gases are allowed to mix in the exhaust channel 132 which serves as a common plenum and holding chamber for the arc plasma at the end of the arc attenuating length L.

Thus each phase in the breaker compartment is dielectrically segregated with arc channels to the extent necessary, the arc channels being joined to a common exhaust plenum, and provided with a cooling channel which does not increase the heat level to the breakers above. By providing each breaker compartment with its own venting and arc interruption channels, and by feeding intake air and exhausting each phase by common plenum, cooler operation can be had for the cabinet 100 over that of the chimney system of FIG. 2, without sacrificing self extinguishing behavior.

Figure 5:
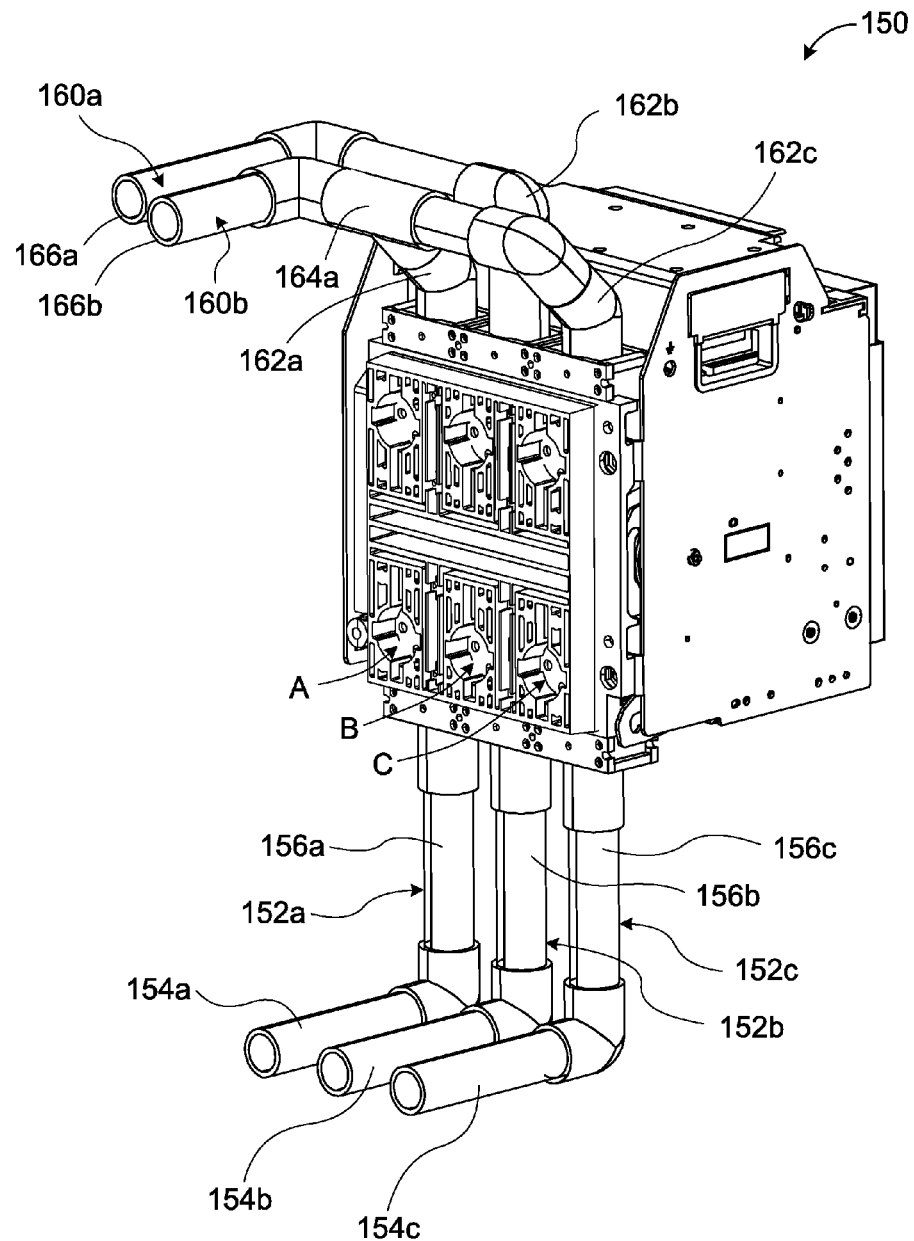
FIG. 5 is a back perspective view of a draw out circuit breaker chassis and back mold with tubing inlet and exhaust channels.

As further discussed below, many variations of through ventilation using inlets, plenums, and exhausts, can be implemented in different types of circuit breakers, such as draw out breakers, fixed breakers, or plug-on breakers. The ventilation channels can lead into or from the front, back, bottom, top, or sides of the breakers. For example, referring also to FIG. 5, a draw out circuit breaker chassis 150 includes inlet vent channels 152a-152c corresponding to each one of phases A-C.

The inlet vent channels 152a-152c can be made from dielectric Polyvinyl Chloride (PVC) tubing and are fine-tuned in accordance with specific design requirements of the breaker chassis 150. For example, the inlet vent channels 152a-152c include a horizontal section 154a-154c with an elbow joint connecting to a vertical section 156a-156c. The shape and size of the inlet vent channels 152a-152c are helpful in receiving airflow from cooler areas of the electrical enclosure. Thus, without the inlet vent channels 152a-152c (shaped and sized in accordance with specific design requirements), the received airflow might consist of relatively higher-temperature airflow near the breaker chassis 150. A further benefit provided by PVC tubing is that the inlet vent channels 152a-152 can be retrofitted into existing electrical equipment without further modifications to the electrical equipment and/or the electrical enclosure, and ensuring that each breaker in an enclosure can be provided individual arc attenuation and ventilation apparatus. Thus, rather than phase-common chimneys for the vertically stacked breakers, each breaker compartment can be separately vented while maintaining arc-interrupting functionality.

The breaker chassis 150 further includes exhaust channels 160a, 160b that direct the airflow externally of the draw out circuit breaker 150. A first exhaust channel 160b is a common channel that receives airflow from both phase A and phase C of the breaker chassis 150. A second exhaust channel 160a is a dedicated channel that receives airflow only from the corresponding phase B of the breaker chassis 150. To combine the airflow from phases A and C, two sections of PVC 162a, 162c are coupled to a common section 164a between the breaker chassis 150 and an exhaust point 166b. Each section 162a, 162c is connected to a respective arc channel of the breaker inside the closed back mold (FIG. 4). In contrast, the first exhaust channel 160b includes a continuous section of PVC 162b that continues the exclusive arc channel 120b (FIG. 4) of phase B. The second exhaust channel 160a ends at its own exhaust point 166a.

The exhaust channels 160a, 160b are helpful for ducting breaker exhaust to eliminate the risk of burns as well as reducing the potential for and/or interrupting arcs. Arc products, such as plasma, gases, combustion products, etc., that are exhausted through the exhaust channels 160a, 160b are expected to cool to an acceptable level after traveling a certain length through the exhaust channels 160a, 160b. Further, the exhaust channels of the present invention may be configured to capture breaker tripping exhaust, thereby providing protection which is not even covered by existing industry standards, such as the National Fire Protection Association (NFPA) standards or the Institute of Electrical and Electronics Engineers (IEEE) standards.

Figure 6:
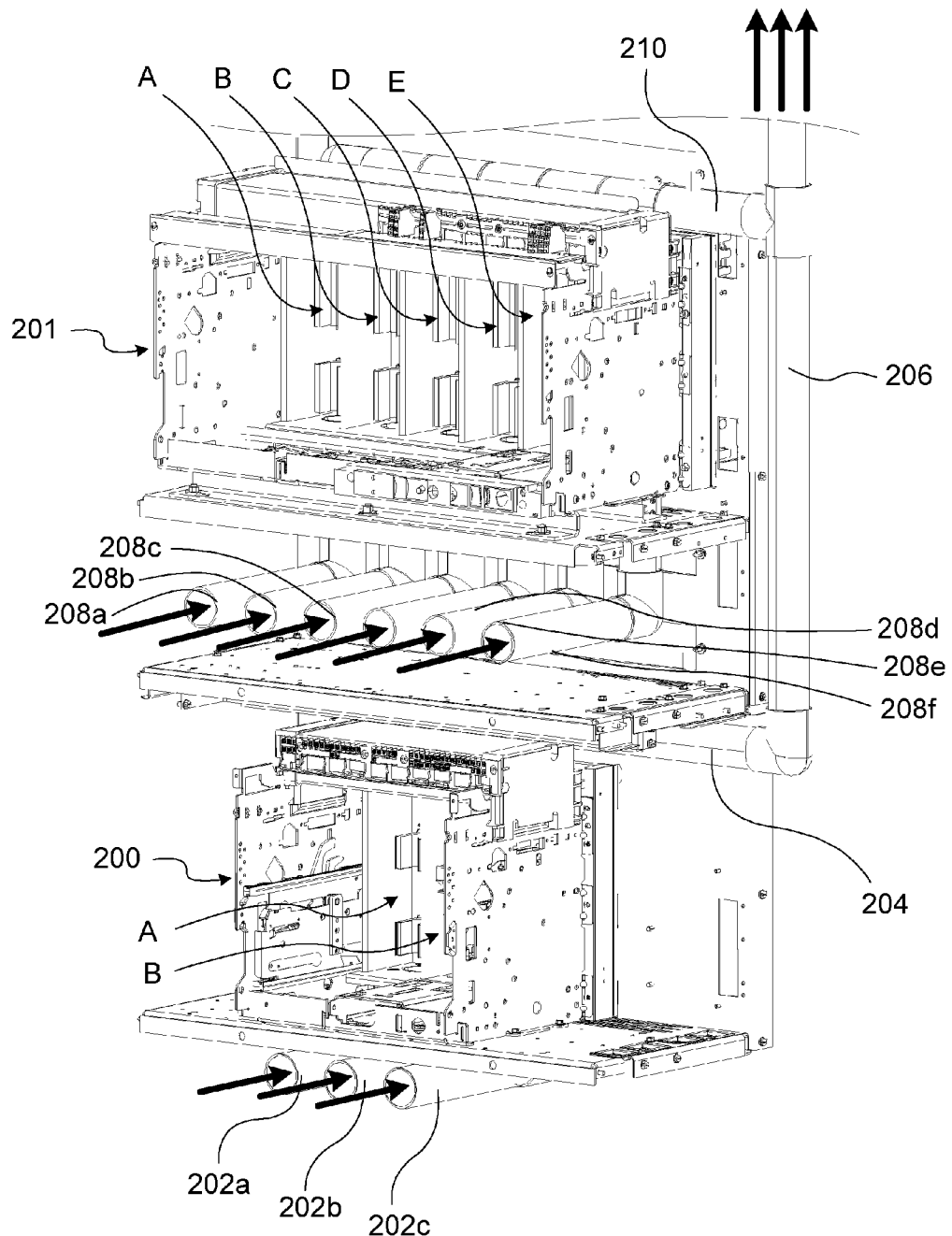
FIG. 6 is a front perspective view of a draw out circuit breaker chassis and back mold showing a ventilation configuration with a common exhaust channel.

Referring to FIG. 6, PVC tubing is implemented to provide ventilation channels in a different configuration of electrical equipment, which includes a lower three pole three-phase chassis 200, for accommodating a three-pole breaker, and an upper six pole three-phase chassis 201, for accommodating a six pole three-phase breaker. The three-phase chassis 200 includes three inlet vent channels 202a-202c corresponding to arc channels surrounding respective ones of phases A-C (only phases A and B shown). Airflow from the arc channels is led into a single exhaust channel 204 that is horizontally positioned and that is coupled to a common vertical exhaust vent channel 206.

The six pole three-phase chassis 201 includes six inlet vent channels 208a-208f leading to arc channels surrounding respective ones of poles A-F (only poles A-E being shown). Airflow from the inlet vent channels 208a-208f is eventually let into a single exhaust channel 210 that is horizontally positioned and that is coupled to the common vertical exhaust vent channel 206. Thus, airflow from both the three pole three-phase chassis 200 and the six pole three-phase chassis 201 is exhausted from the single common exhaust vent channel 206.

As such, an electrical configuration can include any number of inlet and exhaust channels. According to the above example, the number of inlet and exhaust channels can be less than the number of phases. Furthermore, the tubing of the electrical configuration can include sublimating materials for the conduit, and might have any cross-sectional shape, e.g., round or rectangular.

During regular operation, the inlet vent channels 208a-208f and the exhaust channels 210 and 204 provide cooling airflows over enclosed electrical conductors (e.g., line side conductors and/or load side conductors of a circuit interrupting device). Under arcing conditions, the same inlet vent channels 202a-202c and 208a-208f and exhaust channel 210 and 204 are connected with the arc channels surrounding the conductors for passive attenuation of the arc and evacuation of the arc products.

Figure 7:
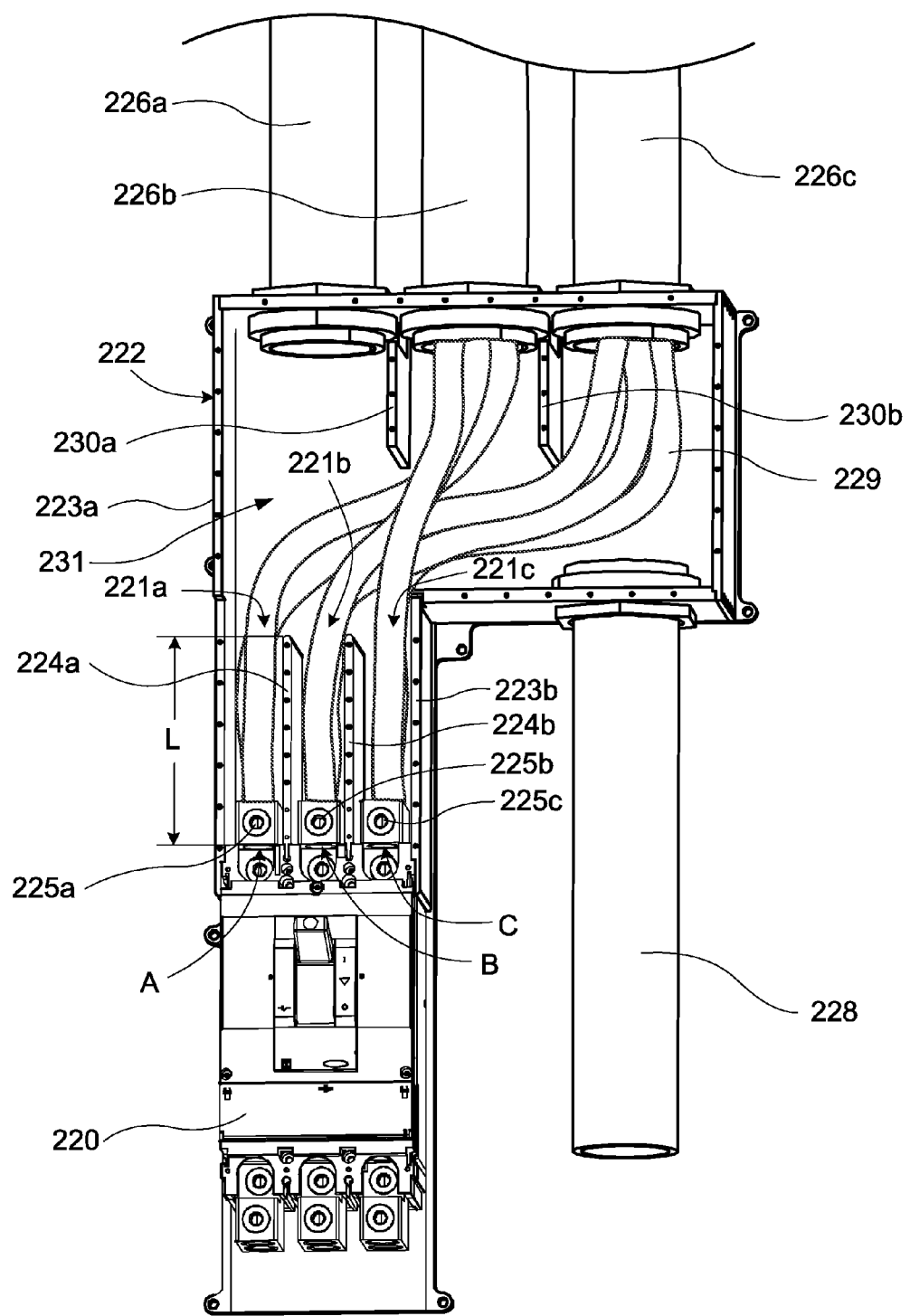
FIG. 7 is a perspective view of a rectangular electrical enclosure with its cover removed and a fixed circuit breaker therein.

Referring to FIG. 7, arc channels with fixed barriers are implemented in an electrical enclosure for molded case breakers, such as fixed circuit breakers. For example, a three-phase circuit breaker 220 is enclosed within an electrical enclosure 222 with each phase A-C having its own arc channel 221a-221c. The arc channels 221a-221c are defined in part by enclosure sidewalls 223a, 223b and lower fixed barriers 224a, 224b, which separate phases A-C to attenuate and/or interrupt arcs. A complementary top piece (not shown) completes the enclosure 222 and seals the fixed barriers in a gas tight manner to form the arc channels. The lower fixed barriers 224a, 224b extend a distance L from the breaker 220 into a common exhaust channel 231 to provide a sufficient arc channel for each phase.

The enclosure 222 is attached to three top conduits 226a-226c and one bottom conduit 228. Two right top conduits 226b, 226c accommodate power cables 229 that are inserted within the enclosure 222 and are routed through arc channels of each phase A-C to connect to the breaker 220. The left top conduit 226a functions as an exhaust vent channel and the bottom conduit 228 functions as an inlet vent channel for cooling purposes.

Both the lower fixed barriers 224 a, 224 b, and the upper fixed barriers 230 a, 230 b provide anchor points for the complementary top piece (not shown) as well as a physical path for routing the cables 229 between the breaker 220 and the respective conduits 226 b, 226 c. However, in this example only the lower fixed barriers 224 a, 224 b form the arc channels around each phase (in combination with features of the complementary top piece). Gas mixing is allowed in the exhaust channel 231 between the lower fixed barriers 224 a, 224 b and the upper fixed barriers 230 a, 230 b.

Figure 8A:
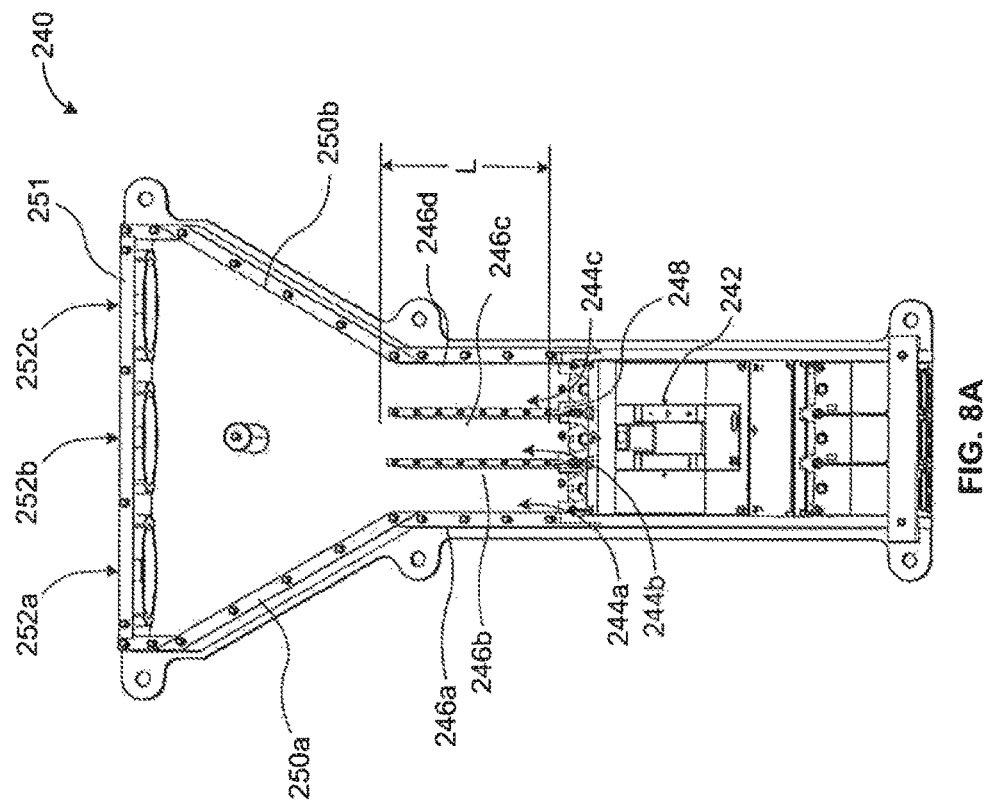
FIG. 8A is a perspective view of the base of a funnel-shaped electrical enclosure with a fixed circuit breaker.
Figure 8B:
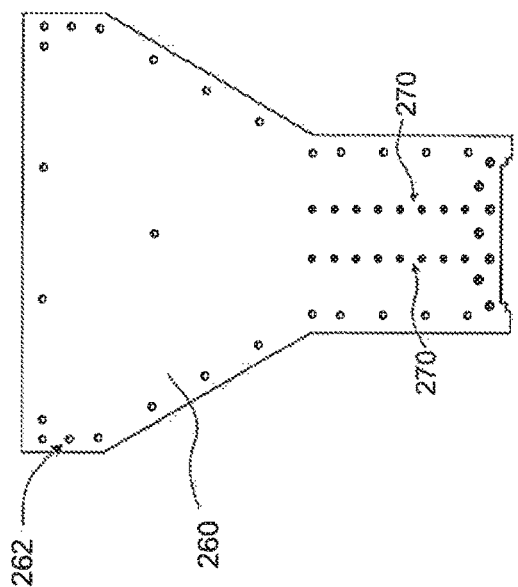
FIG. 8B is a top view of a cover plate for the electrical enclosure of FIG. 8A.

Referring to FIGS. 8A and 8B, arc channels with fixed barriers are implemented in an electrical enclosure that has a non-rectangular shape, e.g., a funnel shape. According to this embodiment, an electrical enclosure 240 (FIG. 8A) is generally similar to the enclosure 222 described above in reference to FIG. 7 except that it has a funnel shape. FIG. 8B is the complementary top piece or cover plate. Unlike FIG. 7, attached cabling and conduits are not shown.

Specifically, the enclosure 240 encloses a fixed circuit breaker 242 near a bottom straight end and includes arc channels 244a-244c—one arc channel per phase. The arc channels 244a-244c are defined by a left sidewall 246a, a left barrier 246b, a right barrier 246c, and a right sidewall 246d. The length L of the barriers 246a, 246b is determined to maintain separation between the arc channels 244a-244c a sufficient length away from conductor lugs 248 to adequately attenuate and/or interrupt potential arcs occurring at the conductor lugs 248 when the breaker 242 is in operation.

The enclosure 240 further includes a top funnel end which has two outwardly tapered sidewalls 250a, 250b that provide additional internal space for the exhaust channel as well as accommodating routing of power cables (not shown) and exhaust of heated air within the enclosure 240. The funnel end has a top wall 251 with three apertures 252a-252c for coupling to respective conduits (not shown). Each of the apertures 252a-252c can receive respective power cables through the coupled conduits. Alternatively, at least one of the apertures 252a-252c can be dedicated to function as an exhaust vent for allowing heated air to exit the enclosure 240.

The enclosure 240 also includes a cover plate 260 (FIG. 8B) that serves to enclose and form the geometry of the arc channels 244a-244c. The cover plate 260 has fastening holes 262 for attachment, for example, to the sidewalls 246a, 246d, 250a, 250b and/or the barriers 246c, 246d. The cover plate 260 is removable to provide interior access to the enclosure 240. Although not shown for clarity purposes, a similar cover plate would be provided for the enclosure 222 of FIG. 7. When cover plate 260 with fastening holes 262 (FIG. 8B) is affixed to enclosure 240 via the fastening holes in, e.g., fixed barriers 246b, c and sidewalls a, d (FIG. 8A), the cover plate 260 seals the fixed barriers 246b, c in a gas-tight manner, such that the fixed barriers 246b, c include gas-tight fixed seals 270.

In general each embodiment of the present invention may have arc channels which are tubular dielectric barriers that surround electrical conductor joints, i.e. where the sections of conductor are joined to each other, at the circuit breakers and other components. According to the illustrated examples, the arc channels can be walled segments that extend from a bottom conductor area, where low heat airflow Amin is received, to an upper area, where a higher heat airflow Amax' is exhausted to a plenum or exhaust. The plenum can be common among multiple phases as long as it is distanced sufficiently from the conductor area by an arc channel. In other examples, the arc channels may be positioned only near conductor joints of the breakers (see, e.g., FIG. 7 showing conductor joints in the form of lugs 225 a-225 c that connect respective cables 229 to the breaker 220).

The arc channels and connected exhaust channels are helpful in passively attenuating and/or interrupting arcs that may occur at one or more of the conductor joints. For example, a system according to the present invention can conceivably passively interrupt an arc in less than one current cycle (16.66 milliseconds for 60 hertz). Based on industry tests that commonly allow a total test duration of 500 milliseconds or more, the reduction in duration is significant (by a factor of about 50) because it reduces the amount of plasma generated, the overall burn risk, and the amount of damage to electrical equipment.

While particular embodiments, aspects, and applications of the present invention have been illustrated and described, it is to be understood that the invention is not limited to the precise construction and compositions disclosed herein and that various modifications, changes, and variations may be apparent from the foregoing description without departing from the spirit and scope of the invention as defined in the appended claims.

What is claimed is:

1. An electrical apparatus for management of arc faults, the apparatus comprising:
   an electrical enclosure;
   electrical equipment within the enclosure and having one or more electrical phases with respective electrical conductors;
   arc channels having fixed barriers surrounding each of the electrical conductors at a conductor joint thereof, each arc channel being of sufficient length to attenuate an arc produced at the conductor joint; and
   an exhaust channel connected in fluid communication to each arc channel at the end of its sufficient length.

2. The apparatus of claim 1, wherein the barriers include gas-tight fixed seals.

3. The apparatus of claim 1, wherein each of the arc channels and its communicating exhaust channel define a geometry configured to achieve an arc interrupt based on a known voltage carried by the enclosure.

4. The apparatus of claim 1, wherein the exhaust channel includes a common exhaust plenum in which arc products are received from one or more electrical phases.

5. The apparatus of claim 1, wherein the exhaust channel includes separate exhaust channels for each phase.

6. The apparatus of claim 1, wherein the exhaust channel is a part of a ventilation channel connected, internally with the arc channels, and externally with the exterior environment outside the electrical enclosure.

7. The apparatus of claim 6, wherein the ventilation channels include an inlet vent channel and the exhaust channel.

8. The apparatus of claim 6, wherein the ventilation channels include a single inlet plenum for all the phases.

9. The apparatus of claim 6, wherein the ventilation channels include separate inlet channels for each phase.

10. An electrical apparatus for management of arc faults, the apparatus comprising:
    an electrical enclosure;
    a circuit interrupting device within the enclosure and having one or more electrical phases with a line side conductor and a load side conductor attached thereto;
    arc channels having tubular dielectric barriers surrounding each conductor of the one or more electrical phases, the barriers being positioned near a conductor joint, the arc channels having an intake end near the line side and an exhaust end near the load side; and an exhaust channel coupled to the exhaust end of the arc channels.

11. The apparatus of claim 10, further having an inlet vent coupled to the intake end of the arc channels; wherein the inlet vent is a common plenum leading into the enclosure and being in fluid communication with each of the arc channels.

12. The apparatus of claim 10, wherein the exhaust channel is a common plenum leading out of the enclosure and in which arc products are funneled from the arc channels.

13. The apparatus of claim 11, wherein at least one of the inlet vent and the exhaust channel includes ventilation channels dedicated to each phase of the one or more electrical phases.

14. The apparatus of claim 11, wherein the inlet vent and the exhaust channel have a length sufficient to achieve arc gas cooling rates in accordance with a predetermined test requirement.

15. A method for limiting arc blast, extinguishing arcs, and ventilating conductors in an electrical enclosure containing electrical circuit conductors and a circuit interrupting device connected to the electrical circuit conductors, the method comprising:

placing fixed dielectric channels, respectively, around each electrical circuit conductor connected to the circuit interrupting device, the fixed dielectric channels having an intake end and an exhaust end;

the fixed dielectric channels having a length sufficient to achieve an arc current attenuation; and coupling the intake end to an inlet vent and the exhaust end to an exhaust vent, the inlet and exhaust vents having a length sufficient to achieve arc gas cooling rates in accordance with a predetermined test requirement such that an interruption of an arc occurs within a predetermined time period.

16. The method of claim 15, further comprising funneling arc gas from the exhaust end of each of the fixed dielectric channels into a common exhaust plenum of the exhaust vent.

17. The method of claim 15, further comprising receiving inlet air at the intake end from a common inlet plenum of the inlet vent.

18. The method of claim 15, further comprising receiving arc gas from the exhaust end of each of the fixed dielectric channels into a respective exhaust channel of the exhaust vent.

19. The method of claim 15, further comprising receiving arc gas from at least two of the fixed dielectric channels into a single exhaust channel of the exhaust vent.

20. A method for limiting arc blast, extinguishing arcs, and ventilating conductors in an electrical enclosure containing electrical circuit conductors and a circuit interrupting device connected to the electrical circuit conductors, the method comprising:

forming fixed dielectric channels, respectively, around each electrical circuit conductor connected to the circuit interrupting device, the fixed dielectric channels having a first end and a second end;

the fixed dielectric channels having a length sufficient to achieve an arc voltage attenuation such that an interruption of an arc current occurs within a predetermined time period; and coupling the second end to an exhaust plenum, the exhaust plenum having a volume sufficient to achieve arc plasma cooling rates sufficient to extinguish an arc in accordance with a predetermined test requirement.

* * * * *